Oct. 29, 1946.    W. G. HOWARD    2,410,163
APPARATUS FOR DECRATING EGGS
Filed June 28, 1944    2 Sheets-Sheet 1
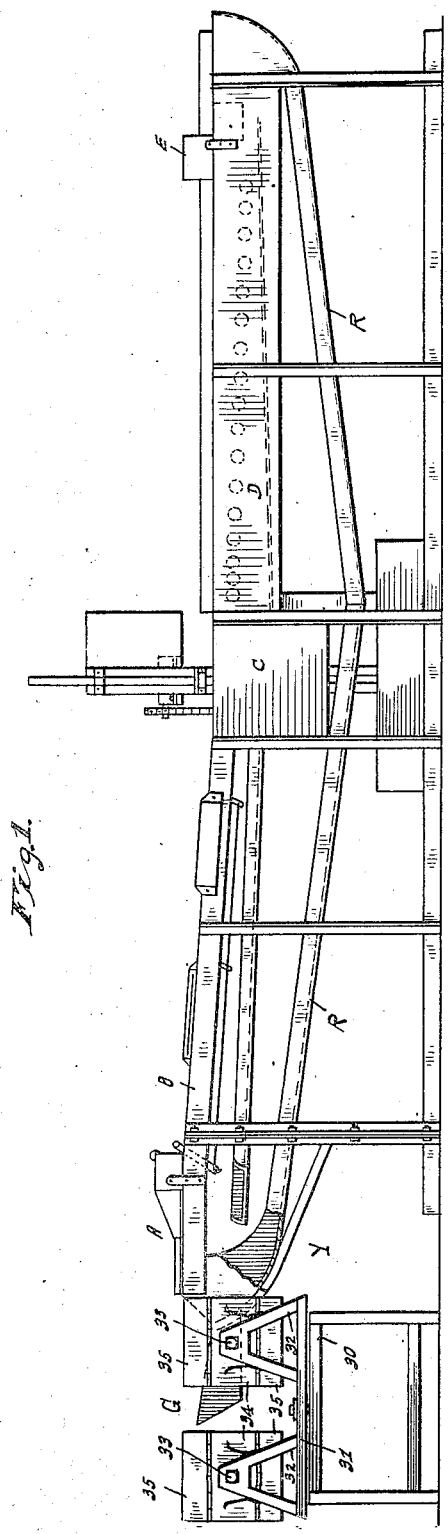
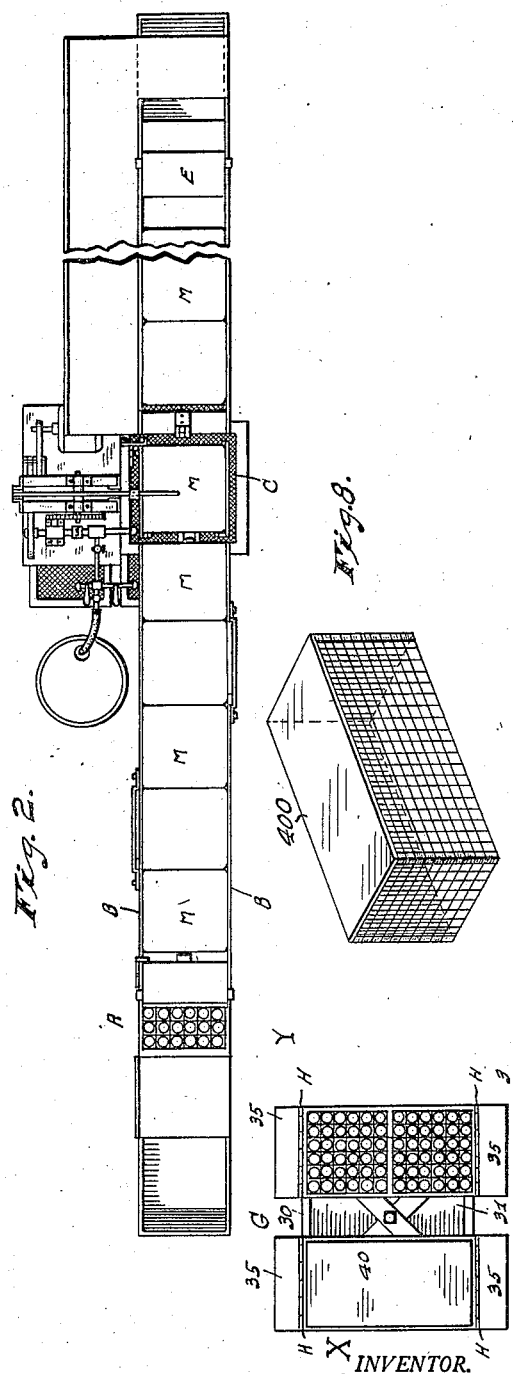
INVENTOR.
WILLIS G. HOWARD,
BY
Hood & Hahn
ATTORNEYS.

Oct. 29, 1946.  W. G. HOWARD  2,410,163
APPARATUS FOR DECRATING EGGS
Filed June 28, 1944   2 Sheets-Sheet 2
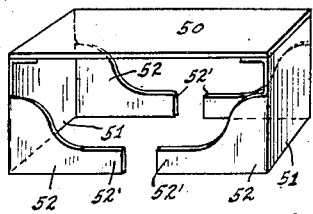
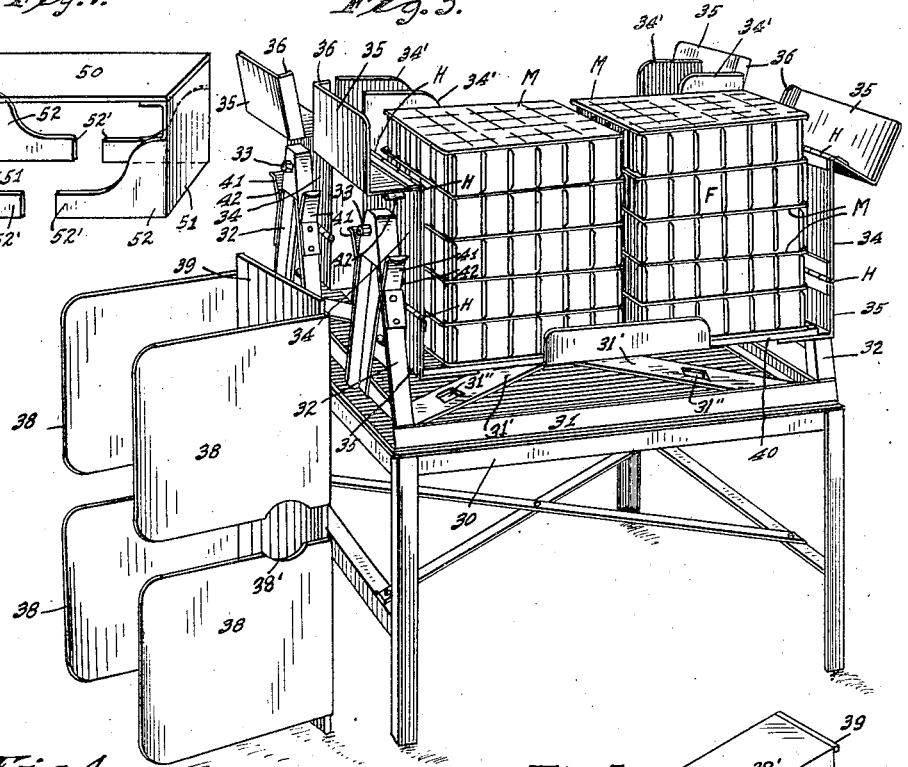
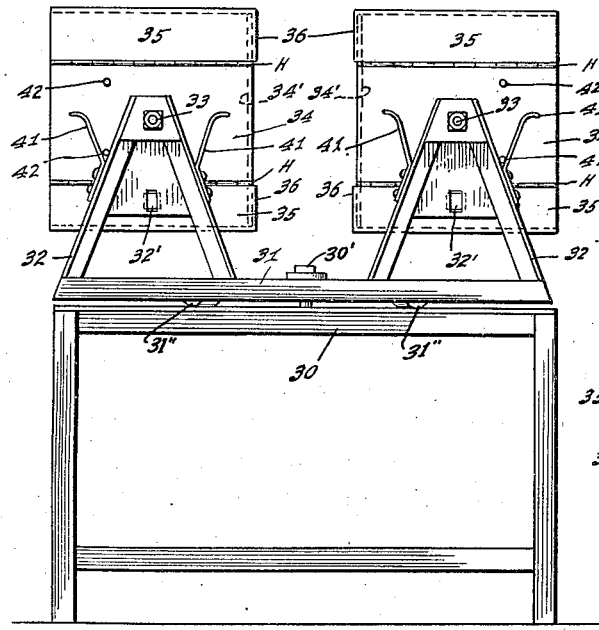
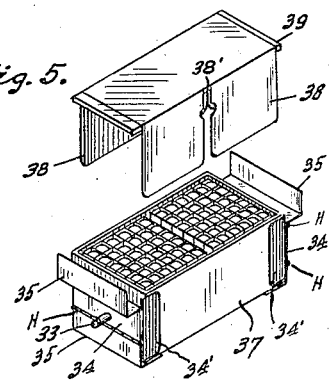
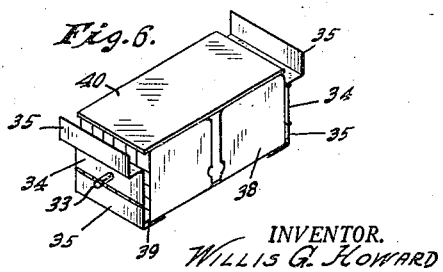
INVENTOR.
WILLIS G. HOWARD
BY Hood & Hahn
ATTORNEYS.

Patented Oct. 29, 1946

2,410,163

UNITED STATES PATENT OFFICE 2,410,163

APPARATUS FOR DECRATING EGGS

Willis G. Howard, Indianapolis, Ind.

Application June 28, 1944, Serial No. 542,536

4 Claims. (Cl. 214—1.1)

It has long been well known that by immersing fresh eggs, such as hen eggs, in a heated bath of suitable oil, deterioration of the eggs may be inhibited for a considerable period, and various mechanisms have been provided for accomplishing the desired treatment, such, for instance, as the mechanisms shown in my Patents Nos. 1,862,508, 1,960,339, and 1,988,795; and Patent No. 1,883,669 to B. E. Ford.

Eggs arrive at a treating plant packed in boxes or crates in groups of three dozen supported by a pocketed base mat and separated by a so-called "filler," a collapsible structure of two series of parallel walls or partitions, one series being positionable at right angles to the other series to form thirty-six cells, one for each of the thirty-six eggs of a group.

In mechanisms of the above-mentioned type, a plurality of cellular metal trays are provided for receiving egg groups and carrying them to, through, and from, the immersing bath, and it is necessary to transfer the egg groups from the shipping crates to such trays, to separate the fillers and base mats, to reassemble the fillers and base mats with the treated eggs and to remove the cellular trays.

The cost of such handling and preservative treatment of the eggs must, of course, be included in the consumer price of the eggs and it is therefore highly important that said treatment cost shall be as low as possible.

The object of my present invention is to provide improved means by which egg-packed crates may be quickly removed from the eggs and associate fillers and mats and the egg-groups so presented to the feeding operator of a treating machine that they may be quickly and safely transferred to the inverting mechanism of the machine without loss of time and without breakage.

The accompanying drawings illustrate my invention.

Fig. 1 is a side elevation of a treating machine, of the type mentioned, with my improved decrating mechanism in place;

Fig. 2 is a plan of the parts shown in Fig. 1;

Fig. 3 is a perspective view of my improved decrating mechanism;

Fig. 4 is an end elevation of the mechanism;

Figs. 5 and 6 are perspective diagrams, on a smaller scale, illustrating intermediate steps in the decrating operation;

Fig. 7 is a perspective view of a modified form of follow board; and

Fig. 8 is a modified form of bottom board.

In the drawings A indicates an egg-group inverting means, B a runway, for said egg groups, inclined downwardly to an immersion tank C from which leads a downwardly inclined runway D delivering to a tray reverting means E, all subtended by suitable drainage pans and by a runway R leading from the delivery end of means E to a point adjacent the receiving end of means A, said parts being, in general, like similar parts in my previously mentioned patents.

Adjacent the receiving end of the inverting means A is the decrating means G which contributes materially to speed up the operation of the apparatus considered as a whole.

Means G comprises a main frame or table 30 upon which is pivoted, at 30', the turntable 31 upon which are erected two pairs of standards 32—32. The table 31 comprises radiating arms 31' carrying rollers 31'' which rest and roll upon the top of table 30. Pivotally supported on each standard 32 by a horizontal trunnion pin 33 is a vertical plate 34, to two opposite edges of which are hinged the vertical arms of L-shaped supplements 35—35, each provided at one end with a brace wall 36 in a plane at right angles to the two arms of the L. The axes of the hinges H are substantially in line with the vertical arms of supplement 35 so that weight may be imposed on the horizontal arms without causing substantial outward swinging of the supplements.

One edge of each plate 34, normal to the two edges to which supplements 35 are hinged, is provided with an inwardly projecting lip 34', the two lips of a plate pair bracing the two arms of the supplement.

The trunnion pins 33 of two plates 35—35 are aligned and the plates 34 axially spaced a distance slightly greater than the length of a standard egg crate 37 so that an operator at X (Fig. 2) may place an open-topped filled crate therebetween and supported by the free arms of the L's braced by walls 36, the upper L's 35 having been swung outwardly, as shown in Fig. 3. Thereupon the depending plates 38, 38 carried by follow-board 39 are inserted into the crate between the side walls thereof and the stacks of egg-filled fillers F until board 39 rests upon said stacks. The outwardly swung upper L's 35 are then swung over follow-board 39 and the plates 34 rotated 180° to bring the crate 37 bottom up. The then upper L's 35 are swung outwardly and the crate is then removed upwardly and a bottom board 40 laid on the egg-filled stacks of fillers. The uppermost L's are swung back to bring their free arms over the ends of board 40 and plates 34 swing back through 180°. The then uppermost L's are swung outwardly and board 39, with its depending plates, withdrawn upwardly. Thereupon turntable 31 is rotated 180° on its vertical axis 30' so that the egg-filled fillers and supporting mats are easily successively accessible by the operator standing at Y (Fig. 2).

It will be noted that the operator at point Y has presented to him freely accessible egg-filled fillers F, each with a subjacent mat M so that he may quickly and safely transfer the unit—filler, eggs and subjacent mat—to the inverting mechanism A.

One of each pair of standards 32 is provided with stop fingers 41, 41 and the adjacent plate 34 is provided with appropriately placed stop pins 42, 42 which coact with fingers 41, 41 to limit the oscillatory movements of plates 34.

The above-described mechanism contributes very materially to the speed and safety with which egg groups may be transferred from the shipping crates to the treating machine and thus reduces the cost of treatment.

Each standard 32 is provided with a roller 32' which will be engaged by the L-shaped supplements, as plate 34 is swung on its trunnion so as to hold said L-shaped supplements in weight-sustaining position.

If the operator should fail to swing the L-shaped supplements 35 back to position where their free arms overlie the egg groups and crates, said supplements will come into engagement with the supports 32, at 32' as the plates 34 are swung on their trunnions, and be thereby automatically properly positioned.

Recently eggs are being packed in cartons made of corrugated paper and some difficulty has been experienced because of the tendency of the fillers to hang on the exposed edges of the internal flaps of the carton.

In order to overcome this difficulty, I provide, primarily for use in connection with such paper cartons, the modified follow board shown in Fig. 7. Here the board 50 has a length slightly less than the internal length of the carton and a width slightly less than the width of the carton. At each end, board 50 is provided with a downturned wall 51 which, at each of its vertical edges, is provided with an inturned tongue 52, which, for the major portion of its length, as indicated at 52', has a vertical height considerably less than the vertical extent of wall 51, said wall 51 having a vertical extent substantially equal to the depth of the carton.

The tongues 52 have a length slightly less than one-half the internal length of the carton, i. e., something less than the horizontal dimension of the filler.

The vertical dimension of the parts 52' of tongues 52 is preferably slightly greater than the vertical dimension of a filler so that said tongue will flank the two lowermost egg groups when the follow board is inserted in a filled carton and consequently will flank the two uppermost egg groups after the carton has been inverted.

The vertical spacing of parts 52' from the follow board makes it possible for the operator to reach through so as to manipulate the free ends of the tongues for entry into the carton flanking the egg group and their fillers.

Eggs are supposed to be crated, big end up. In many instances, the decrating of eggs discloses broken filler walls, especially the outer bounding walls, so that the eggs in the broken filler cell are likely to fall out when an egg group is being transferred from crate to tray. If the decrating mechanism, described above, is operated so that the crate is inverted and then reverted, removal of the follow board 39 and accompanying depending plates 38 will thus afford an opportunity for eggs in broken outside filler cells to fall out.

If an operator finds a considerable number of broken filler walls in a consignment which is being handled, he will merely invert the crate and withdraw the crate, leaving the egg groups in their fillers lying between the plates 38 which are then upstanding. The egg groups may then be extracted upwardly from between the upstanding plates 38 and, as each egg group is exposed, the operator may readily notice whether there are broken outside filler walls and may guard against eggs dropping out by proper placing of his hands.

Under some conditions, it is desirable that the eggs be placed in the trays small end up, and if that is desired, the egg groups will be extracted from the decrater following inversion of the decrater instead of following reversion of the decrater.

Adjacent edges of plates 38 are cut away as shown at 38' so that the operator may more readily look through to the opposite plates in case any difficulty is experienced in injecting these plates downwardly into an egg crate alongside of the egg group station.

Recently, egg producers have been packing eggs, in conjunction with the usual fillers, in fiber boxes which are smooth inside and from which the egg groups, with some difficulty, may be lifted. In some instances, due to rough handling, the outer walls of the fillers become ruptured and when such a container is handled in my present apparatus, there is a possibility that a partially ruptured filler wall may be further ruptured so that, when the egg groups are exposed, upon reversion, the eggs in cells with outside ruptured walls may drop out and become lost.

In order to take care of this situation, I provide, instead of a bottom board 40, a bottom board 400, provided with upstanding wire mesh walls 401 so spaced that they may be sleeved over the plates 38 and between plates 34, 34 so that, when eggs, so packed, have been inverted and reverted, in the manner described, the two stacks of egg-filled fillers and associate mats will be encased between the wire mesh walls. The operator then may readily observe, as he removes one egg group after another, any ruptured filler walls and, by proper manipulation of his hands, prevent the eggs in ruptured cells from dropping away from the group as he removes it from the stack.

I claim as my invention:

1. Means for decrating eggs, comprising a vertical axis turn table, two parallel pairs of vertical plates journalled on said table on horizontal axes normal to and medially of said plates with the plates of each pair spaced apart a distance slightly greater than one horizontal dimension of a standard egg crate, each of said plates being provided with two L-shaped supplements with their vertical-arm extremities hinged to opposite edges of a plate and their horizontal arms directed toward a companion plate and also provided with a lip at one edge normal to the hinged axes and projecting toward a companion plate, means obstructing outward movement of said supplements when in their lower positions, a follow-board having skirts depending from two opposite sides and so spaced and dimensioned that they may be inserted into an egg crate alongside egg groups packed therein, said follow-board being dimensioned to lie upon and extend between the horizontal arms of the L-supplements of a pair of said end plates and support the stacks of egg groups, and a bottom board dimensioned to lie upon and extend between said horizontal arms of the L-supplements and support the egg groups from which a crate has been withdrawn.

2. Means for decrating eggs, comprising a vertical axis turntable, a pair of vertical plates journalled on said table on a common horizontal axis and spaced apart a distance slightly greater than one horizontal dimension of a standard egg crate, each of said plates being provided with two L-shaped supplements with their vertical-arm extremities hinged to opposite edges of a plate and their horizontal arms directed toward the other plate and also provided with a lip at one edge normal to the hinge axes and projecting toward the companion plate, means obstructing outward movement of said supplements when in their lower positions, a follow-board having skirts depending from two opposite sides and so spaced and dimensioned that they may be inserted into an egg crate alongside egg groups packed therein, said follow-board being dimensioned to lie upon and extend between the horizontal arms of the plate supplements and support the stacks of egg groups, and a bottom board dimensioned to lie upon and extend between said horizontal arms of the plate supplements and support the egg groups from which a crate has been withdrawn.

3. Decrating means comprising a plate having a horizontal trunnion, and two L-shaped supplements for said plate, said supplements being hinged at the free ends of their vertical arms to opposite parallel edges of the plate and with their horizontal arms projecting in the same direction relative to the plane of the plate.

4. Decrating means comprising a plate having a horizontal trunnion, two L-shaped supplements for said plate, said supplements being hinged at the free ends of their vertical arms to opposite parallel edges of the plate and with their horizontal arms projecting in the same direction relative to the plane of the plate, and a journal support for said trunnion arranged to flank said plate and be engaged by said L-shaped supplements when said supplements are in their lowermost positions, to swing the hinged arms of said supplements toward the plane of the plate and oppose swing in the opposite direction.

WILLIS G. HOWARD.